July 10, 1956 G. A. PATRIE ET AL 2,753,840
ROTARY TYPE FEEDER FOR CAGES
Filed Sept. 9, 1953
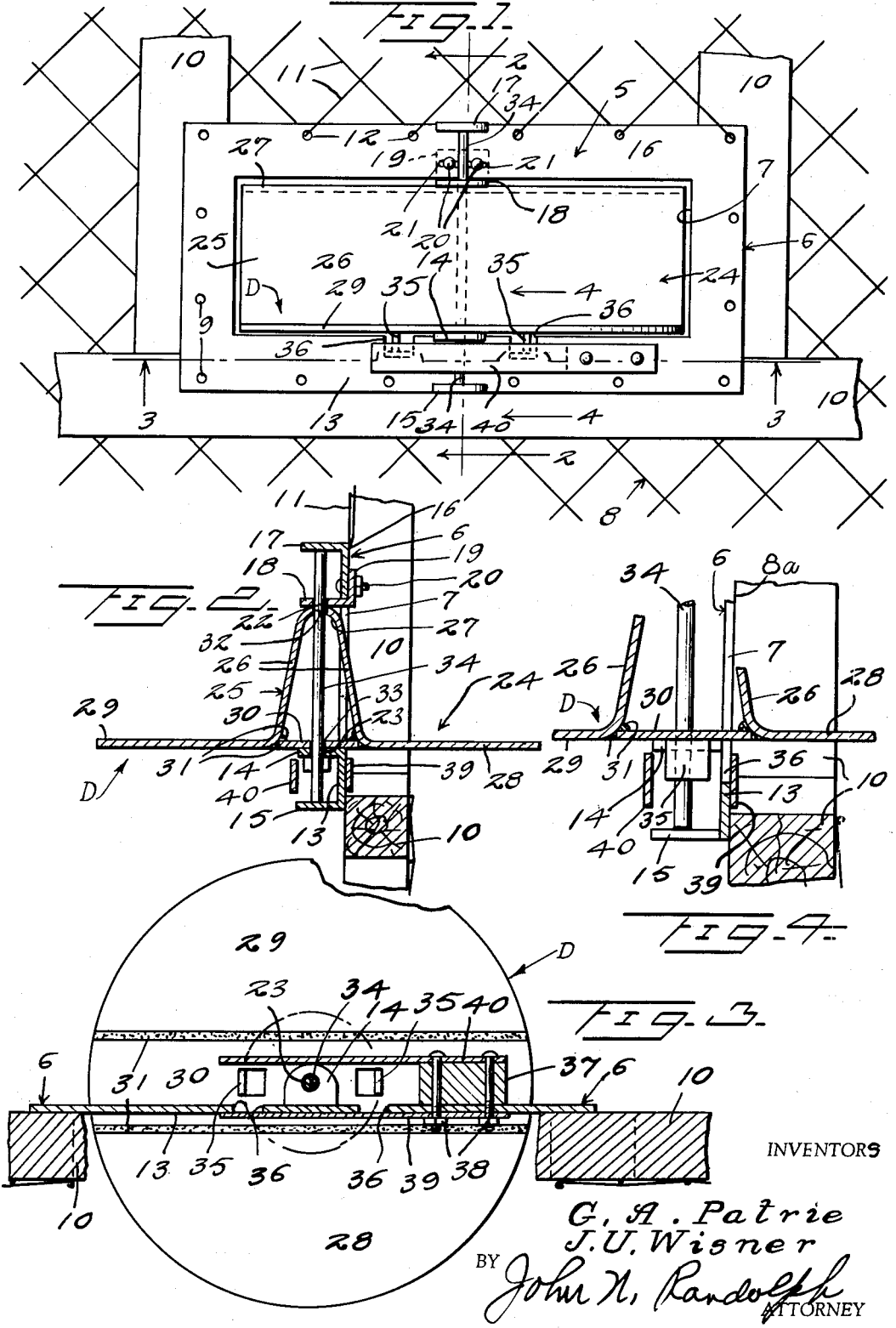
INVENTORS
G. A. Patrie
J. U. Wisner
BY John N. Randolph
ATTORNEY United States Patent Office 2,753,840
Patented July 10, 1956

2,753,840
ROTARY TYPE FEEDER FOR CAGES

Geoffrey A. Patrie, Sheboygan, and Jule U. Wisner, Two Rivers, Wis.

Application September 9, 1953, Serial No. 379,160

7 Claims. (Cl. 119—18)

This invention relates to a novel rotary feeder for penned or confined animals but is likewise adapted for use as a feeder for fowl and birds.

More particularly, it is an aim of the present invention to provide a rotary feeder primarily adapted for feeding penned fur bearing animals such as mink and fox, which is extremely sanitary in use, escape-proof, and which materially reduces the time required for feeding animals since no latches are involved which have to be unlatched and re-latched in accomplishing the feeding operation.

A further object of the invention is to provide a feeder which will economize on the feed used since a feed supporting surface thereof may be scraped after feeding and less food may be supplied where the amount previously fed has not been completely consumed.

Another object of the invention is to provide a feeder which may be very readily cleaned and maintained in a sanitary condition and wherein one-half of the feeder may be cleaned while the second half thereof is in a feeding position thereby eliminating the need for cleaning the feeder between feedings, as is necessary with other feeders.

Various other objects and advantages of the invention will hereinafter become more fully apparent from the following description of the drawing, illustrating a presently preferred embodiment thereof, and wherein:

Figure 1 is a front elevational view showing the feeder in an applied position;

Figure 2 is a cross sectional view thereof taken substantially along a plane as indicated by the line 2—2 of Figure 1;

Figure 3 is a longitudinal sectional view, partly in bottom plan, taken substantially along a plane as indicated by the line 3—3 of Figure 1, and Figure 4 is an enlarged fragmentary vertical sectional view taken substantially along a plane as indicated by the line 4—4 of Figure 1.

Referring more specifically to the drawing, the rotary feeder in its entirety and constituting the invention is designated generally 5 and includes a supporting frame 6 which is preferably formed of sheet metal having an elongated substantially rectangular opening 7.

The frame 6 is adapted to be secured to a wall 8 of an enclosure, such as a pen, as by means of fastenings 9 which are secured to frame pieces 10 of the wall 8 and so that the opening 7 of the frame 6 will register with an opening 8a of the pen wall. One or more sides of the frame 6 may be secured to portions of the mesh wire 11 of the pen wall, which wire portions are anchored to openings 12 of said frame, which are not engaged by the fastenings 9. It will be readily apparent as the description proceeds that the feeder frame 6 could equally well be secured to the outer side of an outer wall of an animal enclosure having an opening to register with the frame opening 7 and that the drawing merely illustrates one preferred application of the feeder 5.

The bottom bar 13 of the frame 6, intermediate of its ends, has an upper ear 14 extending outwardly from its upper edge and a lower ear 15 extending outwardly from its bottom edge, beneath the ear 14. The upper bar 16 of the frame 6 has an upper ear 17 extending outwardly from its upper edge and a lower ear 18 extending outwardly from beneath its bottom edge. The ears 17 and 18 are disposed directly above the ears 14 and 15 and said ears 14, 15 and 17 are preferably formed integral with the frame 6. However, the ear 18 constitutes a separate part and has an upturned extension 19 at its inner end which engages against the inner or rear side of the bar 16 and is detachably and adjustably secured thereto by a suitable means such as a pair of nut and bolt fastenings 20. The fastenings 20 extend through longitudinally elongated openings 21 of the bar 16 to enable adjustment of the ear 18 longitudinally of the frame 6 for centering an opening 22 thereof in vertical alignment with an opening 23 of the ear 14. No openings are provided in the lowermost ear 15 or the uppermost ear 17.

A rotor 24, which is likewise preferably formed of sheet metal, comprises a disk D having an upwardly projecting diametrically extending rib 25 including spaced side walls 26 which are preferably disposed in upwardly converging relationship, as best seen in Figure 2, and which merge at their upper ends to form a rounded top portion 27 of the rib 25. The rib 25 is preferably an integral part of the disk constituting an upwardly pressed diametrically extending portion thereof. The rotor disk includes two corresponding coplanar portions or segments 28 and 29 which extend outwardly from the bottom edges of the rib walls 26 and the outer edges of which are concentrically disposed relatively to the center of the rotor 24. The open bottom of the rib 25 is closed by an elongated plate or bar 30 which is secured as by welding, as seen at 31, to the lower edges of the inner sides of the rib walls 26 and to the inner edges and undersides of the disk segments 28 and 29, and so that the plate 30 is disposed substantially coplanar with said segments 28 and 29. As seen in Figure 3, the ends of the plate 30 are disposed concentric with the outer edges of the segments 28 and 29 to complete the bottom disk portion of the rotor 24.

The rounded top 27 and the plate 30 are provided intermediate of their ends with vertically aligned openings 32 and 33, respectively. A shaft or axle 34 extends through said openings 32 and 33 and through the openings 22 and 23 for rotatably mounting the rotor 24 in the frame 6. The ends of the shaft 34 are disposed between the ears 15 and 17 which retain said shaft against upward or downward displacement. It will be readily apparent that the rotor 24 and shaft 34 may be applied to the frame 6 with the ear 18 detached from said frame and disposed on the shaft above the rib 25 and with said rib disposed at an angle to the plane of the frame 6. After the shaft 34 has been passed downwardly through the opening 23 and positioned beneath the ear 17, the fastenings 20 are applied to secure the ear 18 after it has been adjusted to align its opening 22 with the opening 23. The opening 23 is made sufficiently large to accommodate a slight rocking movement of the shaft 34 relatively to the ear 14 necessary in applying said shaft and the rotor 24 to the frame 6 or in removing it therefrom. By shortening the ear 18 and securing the flange 19 thereof to the forward side of the top bar 16, the shaft 34 may be fixedly secured to the rotor 24, if desired. The rotor 24 is supported for rotation on the ear 14 and around the shaft 34, which is disposed axially of said rotor.

The plate 30 is provided with a pair of struck-out downwardly extending lugs 35 which are disposed transversely thereof and equally spaced radially from its center opening 33 and in longitudinal alignment with one another, as best seen in Figure 3. The upper edge of the bottom frame bar 13 is provided with longitudinally spaced notches 36 through the lugs 35 pass when the rotor 24 is revolved. A spacing block 37 is secured to the outer side of the bottom frame bar 13 by headed bolt and nut fastenings 38, longitudinally of said bar 13 and between one end thereof and the adjacent notch 36. One end of a leaf spring 39 is secured against the inner side of the bar 13 by the fastenings 38 and a corresponding end of a second leaf spring 40 is secured by the fastenings 38 against the outer side of the spacing block 37. The springs 39 and 40 extend from the fastenings 38 toward the remote end of the frame 6 and straddle the shaft 34 and lugs 35, as seen in Figure 3.

From the foregoing it will be readily apparent that the springs 39 and 40 will prevent the rotor 24 from swinging to any appreciable extent in either direction from its position as illustrated in the drawing, in which position the rib 25 substantially closes the opening 7 so that animals contained within the pen or enclosure may not escape outwardly through said opening. With the rotor 24 thus disposed and maintained by cooperation of the springs 39 and 40 with the lugs 35, one of the rotor segments extends inwardly from the frame 6 into the pen or enclosure, this being the segment 28 as illustrated and which is disposed in a feeding position and adapted to contain feed on the upper surface thereof. When feeding the animals within the pen or enclosure, it is only necessary to apply the feed to the upper surface of the outermost segment or tray 29 after which the rotor is revolved a half turn in either direction for positioning the tray or segment 29 to which the fresh supply of feed has been provided within the pen or enclosure and the other segment 28 in a position externally of the enclosure. As the rotor 24 is revolved in either direction from its position of the drawing, the lugs 35 engage the free ends of the leaf springs 39 and 40 and spread these springs until said lugs have swung through arcs of 90° from their positions of Figure 3. Subsequent thereto, the springs 39 and 40 by engagement with the lugs 35 tend to continue the rotation of the rotor 24 until it has completed its half revolution. Thus, feeding of penned animals can be accomplished with the feeder 5 without latching or unlatching any part and after each feeding operation including a half-turn rotation of the rotor 24, said rotor will be retained in its operative position as illustrated. Thereafter at any time desired and prior to the next feeding, the previously used outwardly extending tray or segment 29 may be thoroughly cleaned preparatory to the next feeding and the smooth top surface thereof enables rapid but thorough cleaning of the trays or rotor segments while not in use.

Various modifications and changes are contemplated and may obviously be resorted to, without departing from the spirit or scope of the invention as hereinafter defined by the appended claims.

We claim as our invention:

1. A rotary type feeder of the character described comprising a frame, adapted to be secured to a pen or enclosure wall, having a horizontally elongated opening therein adapted to register with an opening of said wall, a shaft supported by said frame above and below the frame opening and extending thereacross, and a rotor connected to said frame by the shaft and mounted for rotation in the frame opening, said rotor comprising a disk disposed in the bottom part of the frame opening and having an upstanding diametrically extending rib dividing the rotor disk into separate feed supporting segments normally extending from opposite sides of said frame and one of which is disposed on the inner side of the frame in a feeding position, said rib substantially filling and closing the frame opening when said rotor is in a normal position.

2. A rotary feeder as in claim 1, an element fixed to and projecting from the rotor at a point spaced from the axis of rotation of said rotor, and spring means supported by the frame in a position to be engaged by said element for resisting rotation of said rotor and for normally maintaining the rotor in a dwell position with said rib disposed to close the frame opening.

3. A rotary feeder as in claim 1, spaced lugs fixed to said rotor in radially spaced relationship to said shaft, and a pair of leaf spring members fixed to the frame and having unsecured yieldably disposed portions straddling said lugs and disposed to be engaged thereby to resist turning movement of the rotor in either direction from a position in which the rotor rib is disposed to close the frame opening.

4. A rotary feeder as in claim 1, said rib having spaced walls between which said shaft extends and a top portion through which the shaft extends, and said rotor including a bottom portion disposed beneath the rib and through which said shaft extends.

5. A rotary feeder as in claim 4, ears projecting outwardly from an outer side of the frame adjacent the top and bottom edges of the frame opening and through which said shaft extends, a central portion of the rotor being turnably supported on a lower one of said ears.

6. A rotary feeder as in claim 5, said frame having ears projecting outwardly from top and bottom edges thereof and forming stops between which the ends of said shaft are disposed.

7. A rotary feeder as in claim 6, the uppermost one of the first mentioned ears being detachably and adjustably connected to said frame for detachably mounting the shaft and rotor thereon.

References Cited in the file of this patent

UNITED STATES PATENTS

| | | |
|---|---|---|
| 1,602,000 | Custer | Oct. 5, 1926 |
| 2,478,430 | Stahler | Aug. 9, 1949 |

FOREIGN PATENTS

| | | |
|---|---|---|
| 128,397 | Austria | May 25, 1932 |
| 260,014 | Switzerland | July 16, 1949 |